United States Patent Office 2,705,713
Patented Apr. 5, 1955

2,705,713
PRODUCTION OF CYANINE DYESTUFFS

John David Kendall, George Frank Duffin, and Thomas Frederick William Lawrence, Ilford, England, assignors to Ilford Limited, Ilford, England, a British company No Drawing. Application March 2, 1954, Serial No. 413,730

Claims priority, application Great Britain June 16, 1950

7 Claims. (Cl. 260—240.4)

This invention relates to the production of dyestuffs and particularly to the production of dyestuffs which contain a triazolone nucleus and which are of value as sensitising dyes for silver halide photographic emulsions.

The 4-hydroxy 1:2:3-triazoles of the general Formula I:

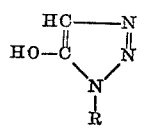

I where R is aryl or halogen-substituted aryl, are desmotropic with the 1:2:3-triazole-5-one, and these compounds and the corresponding 4-carboxylic acids have now been found to be valuable intermediates in the production of a new class of dyestuffs which, providing the systems do not contain nitro groups, are of value as photographic sensitising dyes.

The compound 1-phenyl-1:2:3-triazolone-5 is disclosed by Dimroth in Berichte 35, 4054 but is there referred to as the "enol desmotrope." It is customary nowadays to refer to compounds of this type by either the keto or enol nomenclature (compare Beilstein XXVI, 135, line 7). Dimroth's keto compounds, mentioned in the same paper, are now known to be the isomeric open-chain diazo anilides (compare Dimroth's later papers, Annalen 335, 1; 338, 143; 373, 336; 399, 91). Compounds of Formula I above may be written in the isomeric triazolone Formula IA thus:

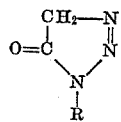

IA

According to the present invention valuable dyestuffs are obtained by reacting a compound of the general Formula I or a corresponding 4-carboxylic acid, in the presence of a basic condensing agent, with (as second reactant) a quaternary salt of a heterocyclic nitrogen compound of any of the types known for use in the production of cyanine dyes, which contains a group of the formula —CH=CH—Q in one of the α and γ positions to the quaternary nitrogen atom, Q being selected from groups of the formulae —SR₁ and —SeR₁ where R₁ is an alkyl, aryl or aralkyl group, and groups of the formula —NR₂R₃ where R₂ and R₃ are each selected from the class consisting of hydrogen atoms, acyl and aryl groups.

The various reactions are based on the reactivity of the methylene group of the triazole ring of the compounds of general Formula I and depend on the removal of the two hydrogen atoms of that group with the resulting formation of a double bond linking the carbon atom of the methylene group to the residue of the other reactant.

Heterocyclic nitrogen compounds with which the compounds of general Formula I may be reacted are, for example, the alkyl or aralkyl quaternary salts of thiazoles, thiazolines, oxazoles, oxazolines, selenazoles, selenazolines, pyridines, quinolines, lepidines, indolenines, diazines (for example pyrimidines), thiodiazoles and quinazolines, and the corresponding substituted and unsubstituted polycyclic compounds of these series such as benzthiazoles, naphthathiazoles and anthrathiazoles, and also the diazoles described in specification No. 425,609.

The quaternary salt may be, for example, an alkyl or aralkyl sulphate, halide (e. g. chloride, bromide or iodide), p-toluene sulphonate or perchlorate.

A typical reaction according to the invention is as follows:

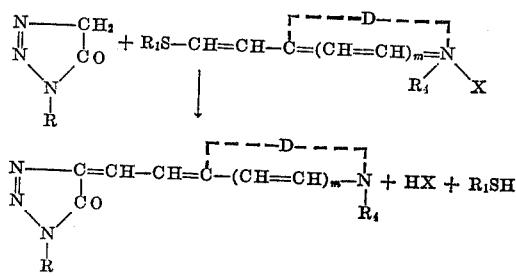

Where the S atoms are replaced by Se atoms similar reaction formulae arise. Where the reactive group is

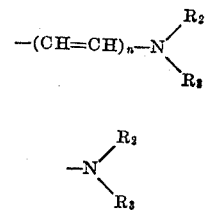

the

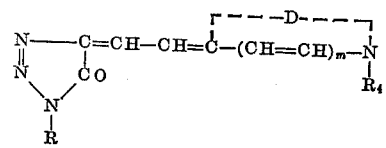

radicle is split away, similar products being obtained.

In accordance with a further aspect of this invention, therefore, dyestuffs are prepared which have the general Formula II:

$$\begin{array}{c} \text{N}\text{——}\text{C}=\text{CH}\text{—}\text{CH}=\overset{\lceil----D----\rceil}{\text{C}}\text{—}(\text{CH}=\text{CH})_m\text{—}\overset{|}{\text{N}} \\ \parallel \quad \quad | \quad \quad \quad \quad \quad \quad \quad \quad \quad \quad \quad | \\ \text{N} \quad \quad \text{C}\text{O} \quad \quad \quad \quad \quad \quad \quad \quad \quad \text{R}_4 \\ \diagdown \text{N} \diagup \\ | \\ \text{R} \end{array}$$

II

In the foregoing reaction formulae and in general Formula II the symbols R, R₁, R₂ and R₃ have the meanings given to them above, m is nought or one, R₄ is an alkyl (hydroxyalkyl or aralkyl group), X is an acid radicle (e. g. one of those listed above) and D is the residue of a heterocyclic nitrogen compound (e. g. one of those listed above).

As indicated above the 4-carboxylic acids corresponding to the 1:2:3-triazole-5-ones may also be employed as starting materials, this being due to the fact that under the reactive conditions the 4-carboxylic acids lose carbon dioxide. Since the usual method of making the 1:2:3-triazoles is by decarboxylation of the carboxylic acid, the use of the acids is preferred as saving one stage in the reaction.

Where the 4-carboxylic acids are employed it is preferred to use pyridine as the basic reagent, this also being a solvent for the reactants. In other cases the preferred base is triethylamine and the reaction is preferably effected in the presence of a solvent for the reactants, e. g. in the presence of both triethylamine and pyridine.

Methods of preparing suitable intermediates for use in this invention are as follows:

The general method of preparation employed in the production of these intermediates is that described by Dimroth, Berichte 35, 4051 et seq. It is found that where the R group contains a halogen substituent, this rides through the process unchanged.

*1-phenyl-1:2:3-triazoline-(5)-4-carboxylic acid*
[cf. Dimroth, Ber. 35, 4051, 4052]

Sodium (1.75 g.) was dissolved in ethanol (150 cc.) and diethyl malonate (13 cc.) and phenyl azide (9 g.) added. After warming on the water bath for four hours the mixture was cooled, the precipitated solid filtered off and washed with ethanol. This mono sodium salt of the triazolone carboxylic ester was hydrolysed by heating at 100° for 30 minutes with 10% aqueous sodium hydroxide (20 cc.) and then cooled to 0°. Excess concentrated hydrochloric acid (4.5 cc.) was added to redissolve the precipitated disodium salt and to precipitate 1-phenyl-1:2:3-triazolone-(5)-4-carboxylic acid which was filtered and dried, M. Pt. 83°.

*1-phenyl-1:2:3-triazolone-(5)*

[cf. Dimroth, Ber. 35, 4054]

The acid (5 g.) was heated with water (25 cc.) and the hot solution evolved copious quantities of carbon dioxide. On cooling the triazolone was deposited as white crystals, M. Pt. 118–9°.

*1-p-bromophenyl-1:2:3-triazolone(5)-4-carboxylic acid*

Sodium (2.3 g.) was dissolved in ethanol (80 cc.) and diethyl malonate (17.0 g.) and p-bromophenyl azide were added. On warming on a water bath an exothermic reaction occurred, and after 30 minutes the mixture was cooled and the precipitated sodium salt filtered off, and washed with ethanol. The solid was then heated for three hours at 100° with 4% aqueous sodium hydroxide (110 cc.), the resulting solution cooled and excess hydrochloric acid (20 cc.) added to precipitate the 1-p-bromophenyl-1:2:3-triazolone(5)-4-carboxylic acid which was filtered off and dried, M. Pt. 97° (d). Dimroth gives 96–100° (d), Annalen, 338, 171.

*1-p-bromophenyl-1:2:3-triazolone-(5)*

The acid (5 g.) was heated with water (30 cc.) and carbon dioxide was rapidly evolved. After cooling the crude triazolone was filtered off. Recrystallisation from ethanol yielded the pure product as colourless crystals, M. Pt. 124° (d). Dimroth, Annalen, 338, 173, gives M. Pt. 124° (d).

*1-p-chlorophenyl-1:2:3-triazolone(5)-4-carboxylic acid*

Sodium (2.5 g.) was dissolved in ethanol (100 cc.) and diethyl malonate (17.6 cc.) and finally p-chlorophenyl azide added. A vigorous reaction occurred, and when it had subsided the mixture was cooled and the precipitated sodium salt filtered off. This solid was warmed on a water bath for two hours with 20% sodium hydroxide (25 cc.) and the mixture then cooled to precipitate the disodium salt which was filtered off, dissolved in the minimum of water and acidified cold with excess concentrated hydrochloric acid (20 cc.) to precipitate 1-p-chlorophenyl-1:2:3-triazolone(5)-4-carboxylic acid which was filtered off and dried, M. Pt. 96° (d).

*1-p-chlorophenyl-1:2:3-triazolone(5)*

The acid (1 g.) was warmed on a water bath with water (10 cc.), and when gas evolution had ceased the mixture was cooled and the triazolone filtered off, and recrystallised from ethanol to give the pure product as colourless crystals, M. Pt. 107° (d).

The following examples will serve to illustrate the invention.

EXAMPLE 1

*1-p-bromophenyl-4-(1':3':3'-trimethyl-1':2'-dihydroindolylidene-2'-)ethylidene-1:2:3-triazol-5-one*

(a) 2-ω-acetanilidovinyl-3:3-dimethyl indolenine methiodide (1.45 g.) and 1-p-bromophenyl-1:2:3-triazol-5-one (0.75 g.) were dissolved in a mixture of pyridine (20 cc.) and triethylamine (0.8 cc.) The solution was heated for five minutes on a steam bath when it became orange in colour. On pouring into water (40 cc.) the dye was precipitated as red crystals which were removed by filtration and on recrystallising from methanol gave the product as red crystals, M. Pt. 238° (d).

(b) 2-ω-acetanilidovinyl-3:3-dimethyl indolenine methiodide (2.23 g.) and 1-p-bromophenyl-1:2:3-triazol-5-one-4-carboxylic acid (1.42 g.) were dissolved in pyridine (35 cc.). The solution was refluxed for five minutes when it became deep orange in colour and on diluting with water (50 cc.) the dye was precipitated as orange-red crystals. After filtering it was recrystallised from methanol as red needles, M. Pt. 238° (d). The dye was identical with that obtained in the above example (a).

This dyestuff, when incorporated in a silver iodobromide emulsion, imparts a band of sensitivity extending to about 5800 Å. with a sharp maximum at 5400 Å.

EXAMPLE 2

*1-p-chlorophenyl-4-(3'-ethyl-2':3'-dihydrobenzthiazolidene-2'-)ethylidene-1:2:3-triazol-5-one*

2-ω-acetanilidovinylbenzthiazole ethiodide (2.25 g.) and 1-p-chlorophenyl-1:2:3-triazol-5-one (0.98 g.) were dissolved in a mixture of pyridine (20 cc.) and triethylamine (0.8 cc.). The solution was heated on a steam bath for ten minutes during which time it became deep orange and orange crystals of the product separated. After cooling to 0° C. the dye was removed by filtration, washed with a small quantity of methanol and then crystallised from methanol giving red needles, M. Pt. 238° (d).

The identical dyestuff was prepared from 2-ω-acetanilidovinylbenzthiazole ethiodide and 1-p-bromophenyl-1:2:3-triazol-5-one-4-carboxylic acid in pyridine.

This dyestuff, when incorporated in a silver iodobromide emulsion, imparts a band of sensitivity extending to about 5700 Å. with a shallow maximum at about 5250 Å.

EXAMPLE 3

*1-p-chlorophenyl-4-(1':3':3'-trimethyl-1':2'-dihydroindolylidene-2'-)ethylidene-1:2:3-triazol-5-one*

2-ω-acetanilidovinyl-3:3-dimethyl indolenine methiodide (2.23 g.) and 1-p-chlorophenyl-1:2:3-triazol-5-one (0.98 g.) were dissolved in a mixture of pyridine (20 cc.) and triethylamine (0.8 cc.). The solution was refluxed for five minutes when it became orange in colour. On dilution with water (40 cc.) the dye was precipitated and after filtering was recrystallised from methanol as red needles, M. Pt. 240° (d).

The identical dyestuff was prepared from 2-ω-acetanilidovinyl-3:3-dimethylindolenine methiodide and 1-p-chlorophenyl-1:2:3-triazol-5-one-4-carboxylic acid in pyridine.

This dyestuff, when incorporated in a silver iodobromide emulsion, imparts a band of sensitivity extending to about 5800Å. with a sharp maximum at 5400 Å.

EXAMPLE 4

*1-p-bromophenyl-4-(3'-ethyl-2':3'-dihydrobenzthiazolylidene-2'-)ethylidene-1:2:3-triazol-5-one*

2-ω-acetanilidovinyl-benzthiazole ethiodide (2.25 g.) and 1-p-bromophenyl-1:2:3-triazol-5-one (1.2 g.) were dissolved in a mixture of pyridine (20 cc.) and triethylamine (0.8 cc.). The solution was heated on a steam bath for ten minutes when it became deep orange in colour and crystals of dye began to separate. After cooling to 0° the dye was removed by filtration, washed with a small quantity of methanol and recrystallised from methanol yielding red needles, M. Pt. 238° (d).

The identical dyestuff was prepared from 2-ω-acetanilidovinylbenzthiazole ethiodide and 1-p-bromophenyl-1:2:3-triazol-5-one-4-carboxylic acid in pyridine.

This dyestuff, when incorporated in a silver iodobromide emulsion, imparts a band of sensitivity extending to about 5700 Å. with an indeterminate maximum at about 5200 Å.

EXAMPLE 5

*1-phenyl-4-(3'-ethyl-2':3'-dihydrobenzthiazolylidene-2'-)ethylidene-1:2:3-triazol-5-one*

2-ω-acetanilidovinylbenzthiazole ethiodide (2.25 g.) and 1-phenyl-1:2:3-triazol-5-one-4-carboxylic acid (1.05 g.) were dissolved in pyridine (20 cc.). The solution was refluxed for fifteen minutes when it became deep orange in colour. On dilution with water (100 cc.) the dye was precipitated and after filtering was recrystallised from methanol as red needles, M. Pt. 227° (d).

EXAMPLE 6

*1-phenyl-4-(1':3':3'-trimethyl-2':3'-dihydroindolylidene-2'-)ethylidene-1:2:3-triazol-5-one*

2-ω-acetanilidovinyl-3:3-dimethyl indolenine methiodide (2.23 g.) and 1-phenyl-1:2:3-triazol-5-one-4-carboxylic acid (1.05 g.) were dissolved in pyridine (35 cc.). After refluxing for five minutes, when the solution became orange, it was diluted with water (500 cc.) when the dye was precipitated. After filtering the product was recrystallised from methanol as red needles, M. Pt. 202° (d).

The identical dye was prepared from 2-ω-acetanilido-vinyl-3:3-dimethylindolenine methiodide and 1-phenyl-1:2:3-triazol-5-one-4-carboxylic acid in pyridine.

EXAMPLE 7

*1-phenyl-4-(1'-ethyl-1':2'-dihydroquinolylidene-2')-ethylidene-1:2:3-triazol-5-one*

2-ω-ethylthiovinylquinoline ethiodide (1.86 g.) and 1-phenyl-1:2:3-triazol-5-one-4-carboxylic acid (1.05 g.) were dissolved in pyridine (20 cc.). The solution was boiled under reflux for thirty minutes when it became violet-red in colour. It was then poured into water (50 cc.) and triethylamine (1 cc.) when the dye was slowly precipitated as red-violet needles. After recrystallising from methanol, the produce was obtained as blue-red needles, M. Pt. 232° (d).

EXAMPLE 8

*1-phenyl-4(1'-methyl-1':4'-dihydroquinolylidene-4')-ethylidene-1:2:3-triazol-5-one*

4-ω-ethylthiovinylquinoline methiodide (1.78 g.) and 1-phenyl-1:2:3-triazol-5-one-4-carboxylic acid (1.05 g.) were dissolved in pyridine (30 cc.) and the solution boiled for thirty minutes when it became deep blue in colour. On pouring into water (50 cc.) and triethylamine (1 cc.) the dye crystallised slowly, was filtered and recrystallised from methanol, yielding blue-green needles, M. Pt. 268° (d).

This dyestuff, when incorporated in a silver iodobromide emulsion, imparts a band of extra sensitivity extending from 7100–7700 Å. with maximum at about 7400 Å.

EXAMPLE 9

*1-p-chlorophenyl-2(1'-ethyl-1':2'-dihydroquinolylidene-2')ethylidene-1:2:3-triazol-5-one*

2-ω-ethylthiovinylquinoline ethiodide (1.85 g.) and 1-p-chlorophenyl-1:2:3-triazol-5-one-4-carboxylic acid (1.2 g.) were dissolved in pyridine (25 cc.) and the solution boiled for thirty minutes. On pouring into water (50 cc.) the dye slowly crystallised, was filtered and recrystallised from methanol as dark red needles, M. Pt. 234° (d).

This dyestuff, when incorporated in a silver iodobromide emulsion, imparts a band of sensitivity extending to 5800 Å. with indeterminate maximum.

EXAMPLE 10

*1-p-bromophenyl-4(1'-methyl-1':2'-dihydroquinolylidene-2')-ethylidene-1:2:3-triazol-5-one*

2-ω-ethylthiovinylquinoline methiodide (1.79 g.) and 1-bromophenyl-1:2:3-triazol-5-one-4-carboxylic acid (1.42 g.) were dissolved in pyridine (25 cc.) and triethylamine (0.8 cc.) added. After heating at 100° for thirty minutes the dye crystallised out and was filtered off after cooling to room temperature. Purification was effected by boiling out with methanol, giving dark red needles, M. Pt. 267° (d).

This dyestuff, when incorporated in a silver iodobromide emulsion, imparts a band of sensitivity extending to 5800 Å. with indeterminate maximum.

EXAMPLE 11

*1-phenyl-4(3'-ethyl-2':3'-dihydrobenzoxazolylidene-2')-ethylidene-1:2:3-triazol-5-one*

2-ω-acetanilidovinylbenzoxazole ethiodide (2.17 g.) and 1-phenyl-1:2:3-triazol-5-one-4-carboxylic acid (1.05 g.) were dissolved in pyridine (20 cc.) and the solution boiled for ten minutes. On pouring into water (50 cc.) the product was precipitated, filtered off and recrystallised from methanol to give bright orange needles, M. Pt. 239° (d).

This dyestuff, when incorporated in a chlorobromide emulsion, imparts a band of sensitivity extending powerfully to 5200 Å. with maximum at about 4900 Å.

EXAMPLE 12

*1-p-chlorophenyl-4(3'-ethyl-2':3'-dihydrobenzoxazolylidene-2')-ethylidene-1:2:3-triazol-5-one*

2-ω-acetanilidovinylbenzoxazole ethiodide (2.17 g.) and 1-p-chlorophenyl-1:2:3-triazol-5-one-4-carboxylic acid (1.2 g.) were dissolved in pyridine (20 cc.) and boiled for ten minutes. On pouring into water (50 cc.) the dye, which was precipitated, was filtered off and recrystallised from methanol to yield the product as red needles, M. Pt. 226°.

This dyestuff, when incorporated in a chlorobromide emulsion, imparts a band of sensitivity extending powerfully to 5200 Å. with maximum at about 4900 Å., and when incorporated in a silver iodobromide emulsion imparts a band of sensitivity extending to about 5400 Å. with maximum at about 5000 Å.

EXAMPLE 13

*1-p-bromophenyl-4(3'-ethyl-2':3'-dihydrobenzoxazolylidene-2')-ethylidene-1:2:3-triazol-5-one*

2-ω-acetanilidovinylbenzoxazole ethiodide (2.17 g.) and 1-p-bromophenyl-1:2:3-triazol-5-one-4-carboxylic acid (1.42 g.) were dissolved in pyridine (25 cc.) and triethylamine added (0.8 cc.) and the solution boiled for ten minutes. On pouring into water the product crystallised, it was filtered and recrystallised from methanol to yield yellow needles, M. Pt. 237° (d).

This dyestuff, when incorporated in a chlorobromide emulsion, imparts a band of sensitivity extending powerfully to 5200 Å. with maximum at about 4900 Å.

The dyestuffs may be used in the normal manner of cyanine sensitising dyestuffs and included in silver halide emulsions of all types, including silver chloride, chlorobromide, bromide and iodobromide emulsions. For sensitising fast silver iodobromide emulsions the dyes in which the heterocyclic nucleus is indolenine are preferred, and particularly those dyes of general Formula II where R is a para halogen substituted group, $m$ is nought, D is the residue of a 3.3-dimethyl indolenine group and $R_4$ is methyl or ethyl. For use in the sensitising of photographic emulsions, however, the dyes should not contain nitro groups as these tend to destroy the sensitising characteristic and may even impart to the dyes a desensitising action.

What we claim is:

1. A process for the production of dyestuffs of the formula:

$$N\underset{N}{\overset{\parallel}{\underset{\diagdown}{\diagup}}}\underset{R}{\overset{C=CH-CH=\overset{|}{C}-(CH=CH)_m-\overset{|}{N}}{\underset{CO}{}}}\underset{R_4}{}$$

where R is selected from the class consisting of phenyl and halogen-substituted phenyl groups, $R_4$ is an alkyl group, D is the residue of a heterocyclic nitrogen nucleus, and $m$ is selected from nought and one, which comprises reacting a compound of the general formula:

$$\underset{O=C}{\overset{H_2C------N}{\underset{N}{\diagdown\diagup}}}\overset{\parallel}{\underset{R}{N}} \rightleftharpoons \underset{HO-C}{\overset{HC------N}{\underset{N}{\diagdown\diagup}}}\overset{\parallel}{\underset{R}{N}}$$

with a compound of the general formula:

$$\underset{R_4}{\overset{N=(CH-CH)_m=\overset{|}{C}-CH=CH-Q}{\underset{X}{}}}$$

where X is an acid radicle and Q is selected from the class consisting of $-SR_1$, $-SeR_1$ and $-NR_2R_3$ where $R_1$ is an alkyl group and $R_2$ and $R_3$ are selected from the class consisting of hydrogen atoms, acetyl and phenyl groups, the reaction being effected in the presence of a basic condensing agent.

2. A dyestuff of the general formula:

$$N\underset{N}{\overset{\parallel}{\underset{\diagdown}{\diagup}}}\underset{R}{\overset{C=CH-CH=\overset{|}{C}-(CH=CH)_m-\overset{|}{N}}{\underset{CO}{}}}\underset{R_4}{}$$

where R is selected from the class consisting of phenyl and halogen-substituted phenyl groups, R4 is an alkyl group, D is the residue of a heterocyclic nitrogen nucleus, and m is selected from nought and one.

3. A dyestuff of the formula:

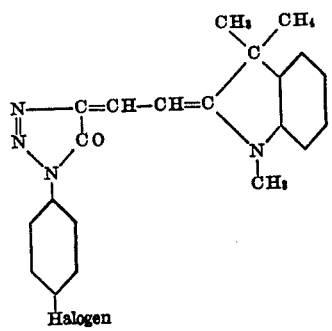

4. A process for the production of the dyestuff of the formula:

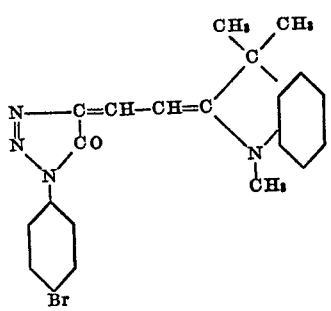

which comprises reacting the compound of the formula:

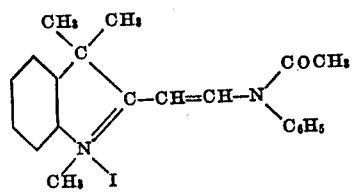

with a compound of the formula:

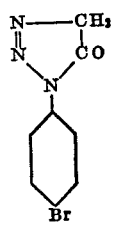

in the presence of a basic condensing agent.

5. A process for the production of the dyestuff of the formula:

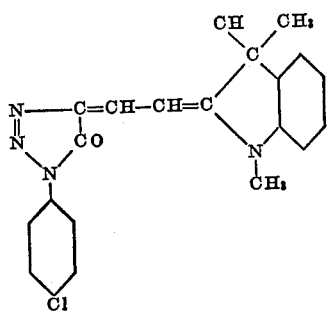

which comprises reacting the compound of the formula:

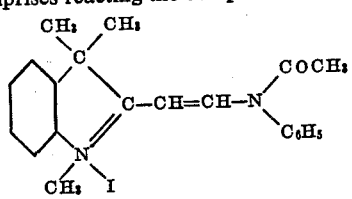

with a compound of the formula:

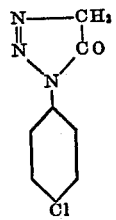

in the presence of a basic condensing agent.

6. The dyestuff of the formula:

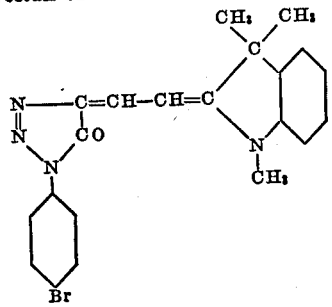

7. The dyestuff of the formula:

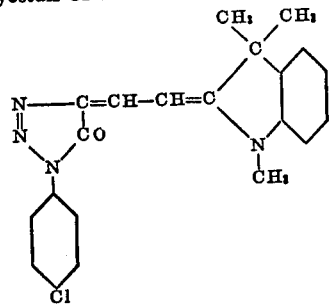

No references cited.